United States Patent [19]

Chan et al.

[11] Patent Number: 5,167,862

[45] Date of Patent: Dec. 1, 1992

[54] ALPHA-HYDROXY CARBOXYLIC ACID DERIVATES SUITABLE FOR USE IN LIQUID CRYSTAL MATERIALS AND DEVICES

[76] Inventors: Lawrence K. M. Chan, 112 Lee Street, Holderness Road, Hull, North Humberside HU8 8NN; David Coates, 12 Blackbushe, Bishop's Stortford, Hertfordshire CM23 5EY; Peter A. Gemmell, 71 The Knoll, Palace Fields, Runcorn, Cheshire WA7 2UH; George W. Gray, 'Glenwood', Newgate Street, Cottingham, North Humberside HU8 9NW; David Lacey, 19 Kildale Close, Hull, North Humberside HU8 9NM; Kenneth J. Toyne, 25 Hall Road, Hull, North Humberside HU68QW; Daniel J. S. Young, 2 York Way, Conisborough, Yorkshire Dn12 3BG, all of England

[21] Appl. No.: 375,639

[22] Filed: Jun. 8, 1989

Related U.S. Application Data

[62] Division of Ser. No. 887,172, Jul. 10, 1986, Pat. No. 4,852,977.

[30] Foreign Application Priority Data

Nov. 13, 1984 [GB] United Kingdom ............... 8428653
Nov. 8, 1985 [WO] PCT Int'l Appl. ........... GB85/00512

[51] Int. Cl.[5] ..................... C09K 19/12; C07C 69/76
[52] U.S. Cl. ........................ 252/299.65; 252/299.01; 252/299.66; 252/299.67; 560/59; 560/62; 560/102
[58] Field of Search ............... 252/299.65, 299.66, 252/299.67, 299.01; 560/59, 62, 102

[56] References Cited

U.S. PATENT DOCUMENTS

| 4,775,223 | 10/1988 | Yoshinaga et al. | 252/299.65 X |
| 4,824,217 | 4/1989 | Chan et al. | 252/299.65 X |
| 4,880,560 | 11/1989 | Yoshinaga et al. | 252/299.01 |
| 4,882,084 | 11/1989 | Ohno et al. | 252/299.66 |
| 4,882,085 | 11/1989 | Yoshinaga et al. | 252/299.65 X |
| 4,900,472 | 2/1990 | Miyazawa et al. | 252/299.01 X |
| 4,911,863 | 3/1990 | Sage et al. | 252/299.65 |
| 4,941,992 | 7/1990 | Jackson et al. | 252/299.66 |

FOREIGN PATENT DOCUMENTS

| 3638119 | 5/1988 | Fed. Rep. of Germany | 252/299.65 |
| 63-254182 | 10/1988 | Japan | 252/299.01 |
| 63-307837 | 12/1988 | Japan | 252/299.65 |
| 8707890 | 12/1987 | World Int. Prop. O. | 252/299.65 |

OTHER PUBLICATIONS

Yoshino, K. et al. Ferroelectrics, 91, 267–76, 1989.
Yoshino, K. et al. Liq. Cryst. 5(4) 1203–11, 1988.
Taniguchi, H. et al. Mol. Cryst. Liq. Cryst. 167, 191–7, 1989.
Taniguchi, H. et al. Jpn. J. Appl. Phys. Part 1, 27(4) 452–5, 1988.

Primary Examiner—Robert L. Stoll
Assistant Examiner—Richard Treanor

[57] ABSTRACT

Compounds which may be used as a dopant or host in a ferroelectric chiral smectic liquid crystal mixture. The compounds are characterized in that they are derivates of an X-hydroxy carboxylic acid and contain the chiral unit (I), in which Ro may be alkyl, alkoxy, halogen, formula (II), where b may be 0 to 3 and the phenyl ring may be substituted, and a is 0 or 1. The chiral unit is combined with a range of mesogenic combinations of groups. Lactic acid derivatives are described in detail (i.e. Ro=methyl) together with various preparative routes, for example the compound formula (III), which has dopant properties in a range of hosts.

8 Claims, 2 Drawing Sheets

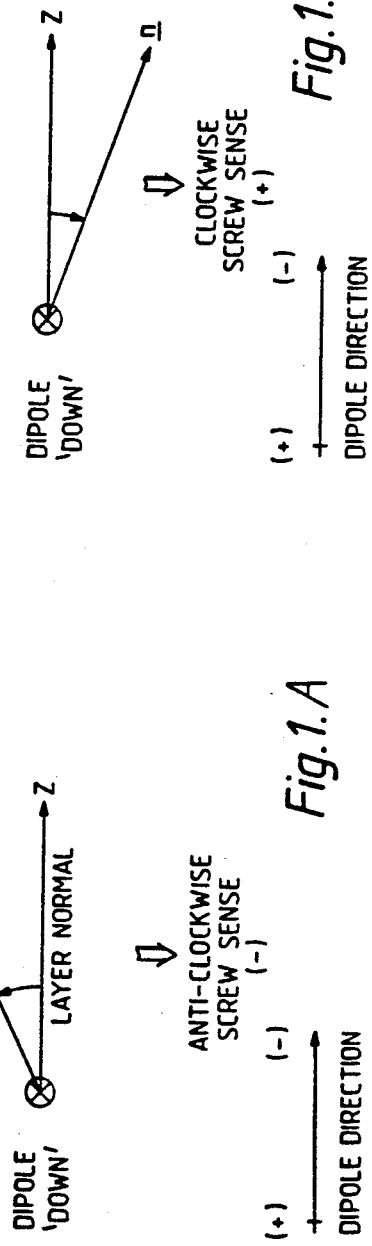
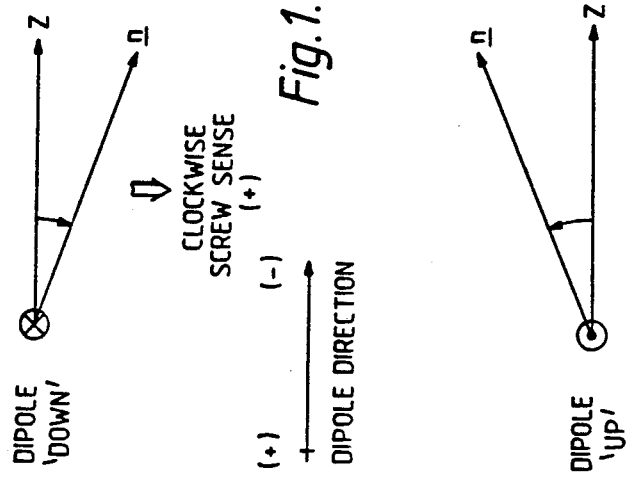
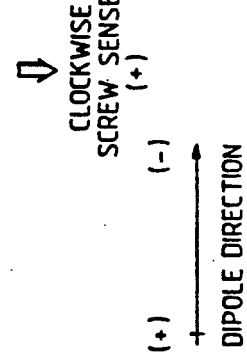
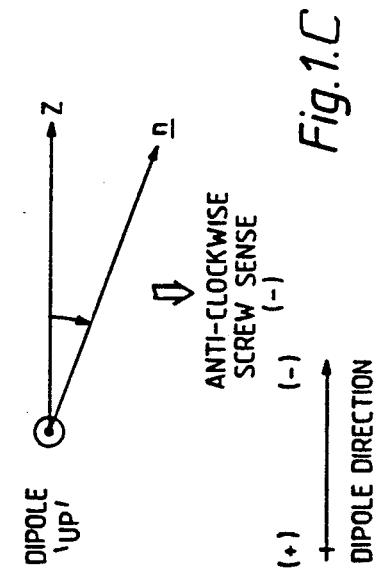

5,167,862

ALPHA-HYDROXY CARBOXYLIC ACID DERIVATES SUITABLE FOR USE IN LIQUID CRYSTAL MATERIALS AND DEVICES

This is a division of application Ser. No. 06/887,172, filed Jul. 10, 1986 now U.S. Pat. No. 4,852,977.

The present invention relates to derivatives of α-hydroxy carboxylic acids suitable for use in liquid crystal materials and devices.

In particular the invention relates to ferroelectric liquid crystal materials, which show a tilted chiral smectic liquid crystal mesophase. Such materials have been proposed for use in rapidly switched electro-optical devices, for example processing and storage devices and displays, based on the ferroelectric properties of the material in the tilted chiral smectic phase, eg as described by N A Clark and S T Lagerwall in 'App Phys Lett' 36 P 899, (1980) (Reference 1).

A measure of the effectiveness of a ferroelectric liquid crystal material is its spontaneous polarisation coefficient Ps. It is desirable to have as high a Ps as possible in a ferroelectric liquid crystal material for electro-optical applications, whilst also combining this high Ps with the other desirable properties generally sought in liquid crystal materials eg low viscosity, broad liquid crystal phase range, stability etc. The tilted smectic phases which exhibit ferroelectric behaviour are the chiral C, F, G, H, I, J, and K phases (designated hereinafter as $S^*_C$, $S^*_F$ etc, the asterisk indicating chirality). The $S^*_C$ pahse is most commonly sought as this is the most fluid. It is also desirable that the liquid crystal materials shows an $S_A$ phase at a temperature above its $S^*$ phase, as this assists surface alignment in the device.

Although some liquid crystal compounds show $S^*$ phases embodying many of the desirable properties outlined above, it is common in practice to use a material which is a mixture of at least two components, or sets of components, i.e. a 'host' which exhibits a smectic phase which may or may not be chiral, and a 'dopant' which is mixed with the host to produce a tilted chiral smectic phase with a high Ps. The dopant may also serve to improve other properties of the host or mixture to produce an advantageous ferroelectric mixture.

In contrast to research on nematic liquid crystals, relatively little is known about desirable molecular structures for $S^*$ compounds and materials. Many materials which are at present used in ferroelectric displays have low Ps values or are chemically unstable, such as the compounds DOBAMBC and HOBACPC described in Ref 1.

It is an object of the present invention to provide a new range of $S^*$ ferroelectric liquid crystal materials having improved properties. Other objects and advantages of the present invention will be apparent from the following description.

BRIEF DESCRIPTION OF THE DRAWINGS

FIGS. 1A, 1B, 1C and 1D illustrate the respective senses of polarization (+) or (−) for various liquid crystal mixtures to be the same or opposed and hence additive or subtractive, in which FIG. 1A shows an anti-clockwise (counterclockwise) screw sense with the dipole down;

FIG. 1B shows a clockwise screw sense with the dipole down;

FIG. 1C shows an anti-clockwise screw sense when the dipole is up, and

FIG. 1D shows a clockwise screw sense when the dipole is up.

DESCRIPTION OF THE INVENTION

Figure 2:
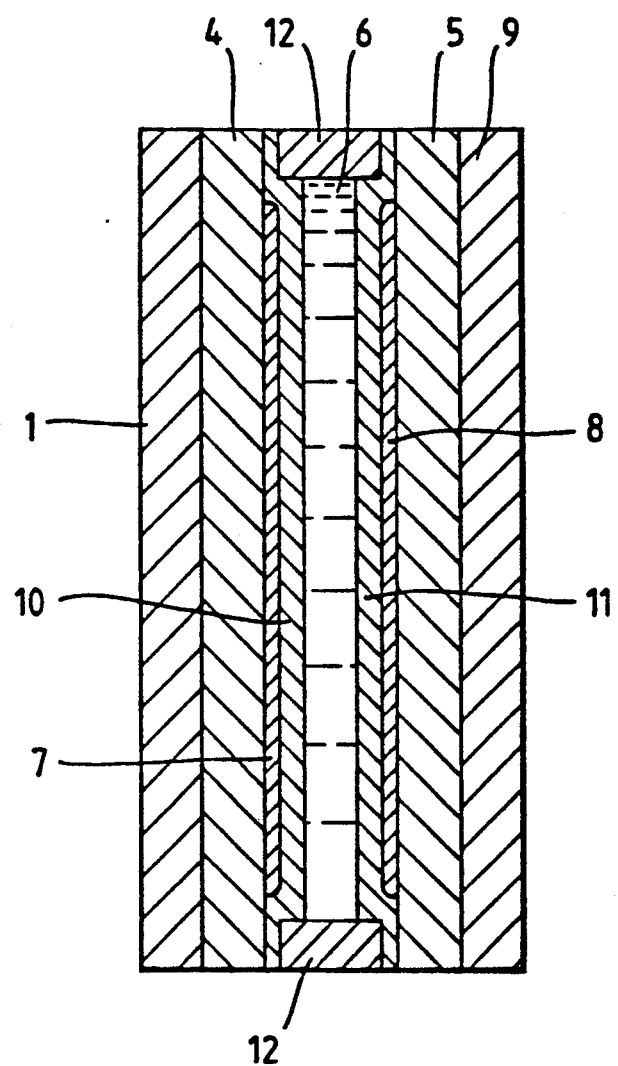
FIG. 2 is a cross-sectional end view of a liquid crystal shutter.

According to the present invention there is provided a compound which may be used as a host or dopant in a ferroelectric chiral smectic liquid crystal mixture, the compound being a derivative of an α-hydroxy carboxylic acid containing the chiral unit:

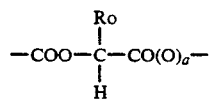

in which Ro represents alkyl, alkoxy, halogen,

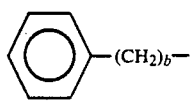

where b is 0 to 3 and the phenyl ring may be substituted with one or more alkyl, alkoxy, halogen or cyano groups and a may be 0 or 1.

In such a compound this unit is linked at both of the indicated termini to a combination of groups which are mesogenic, i.e. promote the formation of smectic liquid crystal phases either in the compound itself, or in mixtures with other potentially smectic compounds.

The type of groups which are likely to be mesogenic are generally well known in liquid crystal chemistry and the combination of the above unit with a wide range of mesogenic groups will provide the advantages discussed below.

Some particularly advantageous combinations have been discovered, and therefore according to the present invention in a second aspect there is provided a derivative of an α-hydroxy carboxylic acid having a formula:

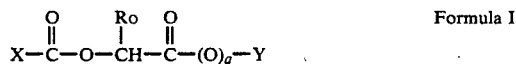

Formula I wherein X represents a group having a structure:

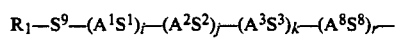

wherein Y represents a group having a structure:

wherein each of $R_1$ and $R_2$ is independently selected from hydrogen, alkyl, alkoxy, fluoroalkyl, fluoroalkoxy, alkoxy substituted alkyl, alkanoyl, alkanoyloxy, alkyl carbonyloxy, alkoxy carbonyl, halogen wherein each of $S^1$, $S^2$, $S^3$, $S^4$, $S^5$, $S^6$, $S^9$ and $S^{10}$ independently represents a single covalent bond or a group selected from CO O, O OC, $CH_2$, $CH_2CH_2$, $CH_2O$, $OCH_2$, —CH=N—, N=CH, CHD, $CH_2$CHD and CHD—$CH_2$ where D represents a substituent CN, $CF_3$, $CH_3$ or halogen wherein each of $S^7$ and $S^8$ independently represents a single covalent bond or any of the groups from which $S^1$, $S^2$, $S^4$, $S^5$, $S^6$, $S^9$ $S^3$ or $S^{10}$ are selected with the exception of COO and OOC, and $S^7$ may also represent $(CH_2)_q$ where q is 1 to 12 wherein each of $A^1$ to $A^8$ is selected from the following cyclic groups, each of which may carry one or more substituents: phenyl, cyclohexyl, bicyclo (2,2,2)octyl, pirane naphthyl, pyridyl, pyrimidyl, piperidyl, or cyclohexyl having one or two —$CH_2$— units replaced by oxygen or sulphur;

wherein each of a, i, j, k, l, m, n, p and r independently represent 0 or 1.

Preferably Ro is either alkyl containing 1–5 carbon atoms, especially methyl (i.e. derivatives of lactic acid, or unsubstitued phenyl (i.e. derivatives of mandelic acid).

a is preferably 1, to provide an ester link.

$S^7$ and $S^8$ are preferably single covalent bonds.

When any of $A^1$ to $A^8$ represents phenyl, the ring is preferably joined to the remainder of the molecule in the 1,4-positions, if the ring is substituted the substituent(s) is or are preferably $CH_3$, $CF_3$, $CN$, $NO_2$, F, Cl, Br or $COCH_3$.

When any of $A^1$ to $A^8$ represents pyrimidyl, it is preferably a 1,3-pyrimidyl, joined to the remainder of the molecule in the 2,5-positions.

When any of $A^1$ to $A^8$ represents an aliphatic ring, the ring is preferably in the trans configuration; if dioxan, then preferably trans 1,3-dioxan joined to the remainder of the molecule in the 2,5-positions; if a substituted cyclohexyl then preferably the cyclohexyl is joined to the remainder of the molecule at the 1,4-positions and carries its substituent(s) in the 1 and/or 4 positions.

Preferably the compound of Formula I contains at least two but no more than 4 of the cyclic groups $A^1$ to $A^6$.

When $R_1$ and/or $R_2$ are halogen they are preferably fluorine.

When $R_1$ and/or $R_2$ are organic groups they preferably are or contain alkyl or alkoxy. Preferably they each contain from 1 to 20 carbon atoms, and preferably the total number of carbon atoms in $R_1$ and $R_2$ is 25 or less. Preferably $R_1$ and/or $R_2$ are or contain an unbranched or chiral alkyl chain. It is particularly preferred that $R_1$ is n-alkyl or n-alkoxy containing 5 to 12 carbon atoms and that $R_2$ is n-alkyl containing 1 to 5 carbon atoms. When X or Y is chiral, they preferably are or contain (+) or (−)2-methyl butyl, (+) or (−)2-methyl butoxy, 2-octyl, 2-heptyl or 2-nonyl.

When $R_2$ is present as an n-alkyl lactate ester, i.e. a=1 and each of l, m, n, and p are O and $S^4$ to $S^7$ and $S^{10}$ together represent a single covalent bond, then $R_2$ is preferably ethyl.

In this description:

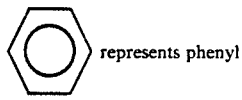 represents phenyl

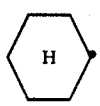 represents trans cyclohexyl, heterocyclic analogues of cyclohexane being represented accordingly

 represents bicyclo (2,2,2) octane

 represents pinane

—L— in a formula represents —COO—CH($CH_3$)—COO—

Examples of preferred structural forms of Formula I are represented by the formulae shown in Table 1 below.

TABLE 1

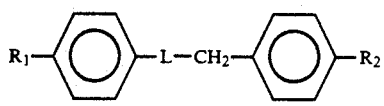 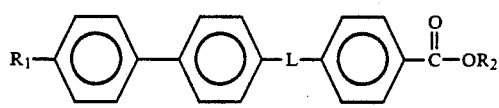

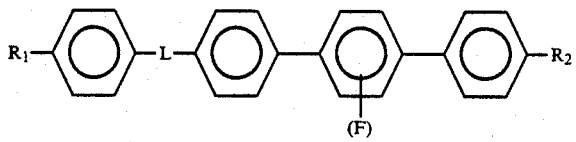 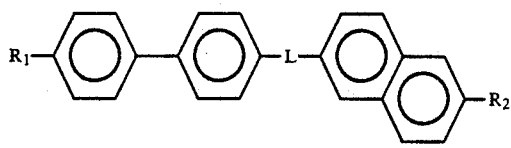

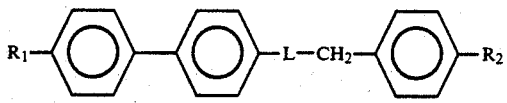 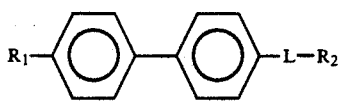

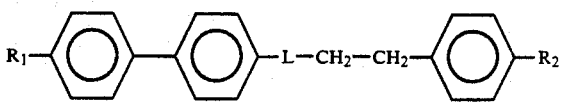 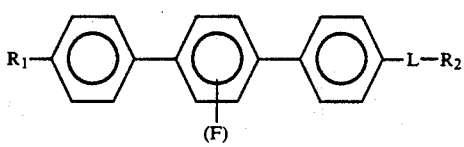

TABLE 1-continued

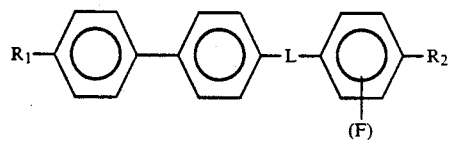 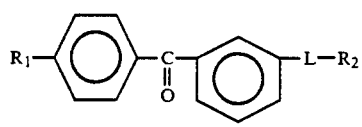

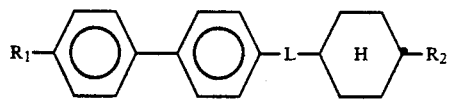 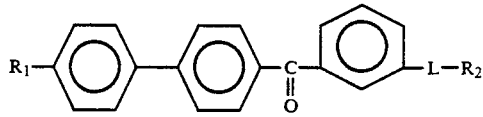

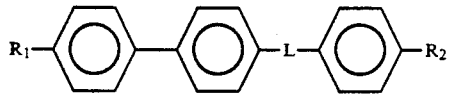 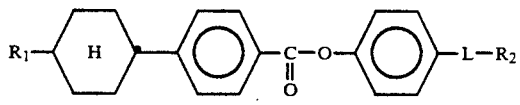

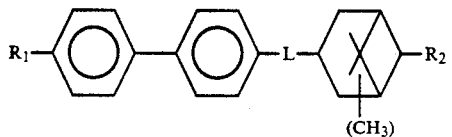 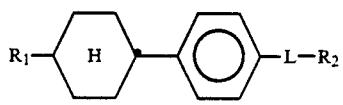

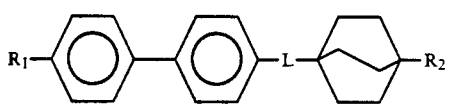 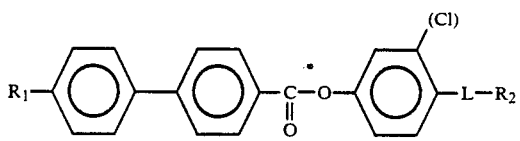

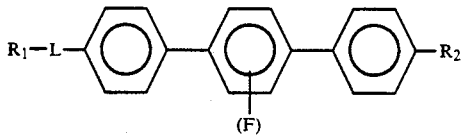 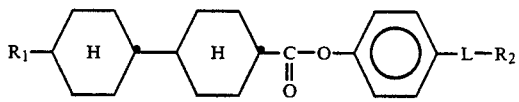

where (F), (CH₃), (Cl) etc in the formulae indicate that the ring may carry one or more of the bracketted substituents.

Particularly preferred structures for X are

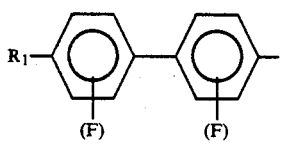

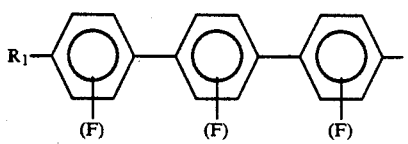

where R₁ is n-alkoxy, especially $C_5$–$C_{12}$ alkoxy.

It appears to be particularly beneficial for Y to be n-alkyl, particularly $C_1$–$C_5$ n-alkyl.

For example compounds of the type:

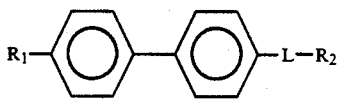

-continued

where R₁ and R₂ are $C_5$–$C_{12}$ alkoxy and $C_1$–$C_5$ alkyl respectively show very high Ps values when added to tilted smectic hosts.

Structures for Y which contain a single cyclic group, or a single naphthyl unit, directly bonded to the L group also often lead to compounds of Formula I which show a high Ps value in a tilted smectic host.

Other examples of structures included in the present invention include those listed in table 2 below, in which Ph represents 1,4-phenyl optionally carrying one or more lateral substituents, Cy represents trans 1,4-cyclohexyl optionally carrying one or more substituents, Bco represents 1,4-bicyclo (2,2,2) octane, each Dx represents trans 2,5-disubstituted 1,3-dioxan and -L- represents —COO.CH(CH₃)COO—

Table 2

R₁—Ph—CO₂—Ph—L—R₂
R₁—Ph—CH₂.CH₂—Ph—L—R₂
R₁—Cy—CO₂—Ph—L—R₂
R₁—Cy—CH₂.CH₂—Ph—L—R₂
R₁—Cy—Ph—Ph—L—R₂
R₁—Cy—CO.O—Ph—Ph—L—R₂

R₁—Cy—CH₂.CH₂—Ph—Ph—L—R₂
R₁—Cy—CH₂—CH₂—Ph—CO₂—Ph—L—R₂
R₁—Cy—CO₂—Ph—Ph—Ph—L—R₂
R₁—Cy—CH₂.CH₂—Ph—Ph—Ph—L—R₂
R₁—Ph—CO₂—Ph—CO₂—Ph—L—R₂
R₁—Ph—L—Ph—R₂
R₁—Ph—CO₂—Ph—L—Ph—R₂
R₁—Cy—CO₂—Ph—L—Ph—R₂
R₁—Cy—CH₂.CH₂—Ph—L—Ph—R₂
R₁—Ph—L—Ph—Ph—R₂
R₁—Ph—Ph—L—Ph—Ph—R₂
R₁—Cy—Cy—CO₂—Ph—L—Ph—R₂
R₁—Cy—CO₂—Ph—L—Ph—R₂
R₁—Cy—CH₂—CH₂—Ph—L—Ph—Ph—R₂.
R₁—Ph—L—Ph—Ph—R₂
R₁—Ph—L—Py—R₂
R₁—Ph—L—Cy—Ph—R₂
R₁—Ph—L—Bco—Ph—R₂
R₁—Ph—L—Py—Py—R₂
R₁—Ph—L—Ph—O.OC—Ph—R₂
R₁—Ph—L—Ph—CH₂.CH₂—Ph—R₂
R₁—Ph—L—Ph—CH₂O—Cy—R₂
R₁—Ph—L—Ph—CH₂.CH₂—Cy—R₂
R₁—Ph—L—Ph—N=CH—Ph—R₂
R₁—Ph—L—Ph—O.OC—Ph—Ph—R₂
R₁—Ph—L—Ph—O.OC—Ph—Cy—R₂
R₁—Ph—L—Ph—O.OC—Cy—Ph—R₂
R₁—Ph—L—Ph—CH₂.CH₂—Cy—Ph—R₂
R₁—Ph—L—Ph—CH₂.CH₂—Ph—Ph—R₂
R₁—Ph—L—Ph—CH₂.CH₂—Ph—R₂
R₁—Ph—L—Ph—CH₂.CH₂—Cy—Ph—R₂
R₁—Ph—L—Dx—CH₂.CH₂—Cy—R₂
R₁—Ph—L—Cy—N=CH—Ph—R₂
R₁—Ph—L—Bco—CH₂.CH₂—Ph—R₂
R₁—Ph—L—Cy—O.OC—Ph—Ph—R₂
R₁—Ph—L—Cy—O.OC—Ph—Cy—R₂
R₁—Ph—L—Cy—Ph—CH₂O—Cy—R₂
R₁—Ph—L—Cy—Ph—O.OC—Ph—Ph—R₂
R₁—Ph—L—Ph—Ph—O.OC—Ph—Ph—R₂
R₁—Ph—L—Ph—Ph—CO.O—Ph—Ph—R₂
R₁—Ph—L—Cy—Ph—Ph—R₂
R₁—Ph—L—Ph—CO₂—Ph—R₂
R₁—Ph—L—Ph—Ph—CO₂—Ph—R₂
R₁—Ph—L—Ph—CO₂—Ph—Ph—R₂
R₁—Ph—L—Ph—Ph—CO₂—Ph—Ph—R₂
R₁—Cy—Ph—L—Ph—Ph—R₂
R₁—Bco—Ph—L—Ph—R₂
R₁—Bco—C.OO—Ph—L—R₂
R₁—Bco—C.OO—Ph—L—R₂
R₁—Bco.C.OO—Ph—L—Ph—R₂
R₁—Bco—CH₂.CH₂—Ph—L—R₂
R₁—Bco—CH₂O—Ph—L—R₂
R₁—Ph—L—Bco—R₂
R₁—Ph—Ph—L—Bco—R₂
R₁—Py—Ph—L—R₂
R₁—Py—CH₂.CH₂—Ph—L—R₂
R₁—Py—CO.O—Ph—L—R₂
R₁—Dx—Ph—L—R₂
R₁—Dx—CH₂.CH₂—Ph—L—R₂
R₁—Ph—L—Cy—R₂

R₁—Ph—CO.O—Ph—L—Cy—R₂
R₁—Ph—Cy—CH₂.CH₂Ph—L—R₂
R₁—Ph—Ph—CO.O—Ph—Ph—L—R₂
R₁—Py—L—Ph—R₂
R₁—Ph—L—Cy—Cy—R₂
R₁—Ph—L—Dx—R₂
R₁—Ph—L—Ph—Cy—R₂
R₁—Ph—L—Bco—R₂
R₁—Ph—L—Ph—Bco—R₂
R₁—Ph—L—Cy—Dx—R₂
R₁—Ph—L—Cy—O.OC—Ph—R₂

Lactic Acid derivatives of Formula I may be prepared by a number of preparative methods.

Method 1

For example they may be made from lactic acid (HO.CH(CH₃)CO.OH) by two esterifications as in Route a or Route b as follows wherein each Q independently represents a suitable reactive group normally used in esterifications, e.g. chloride.

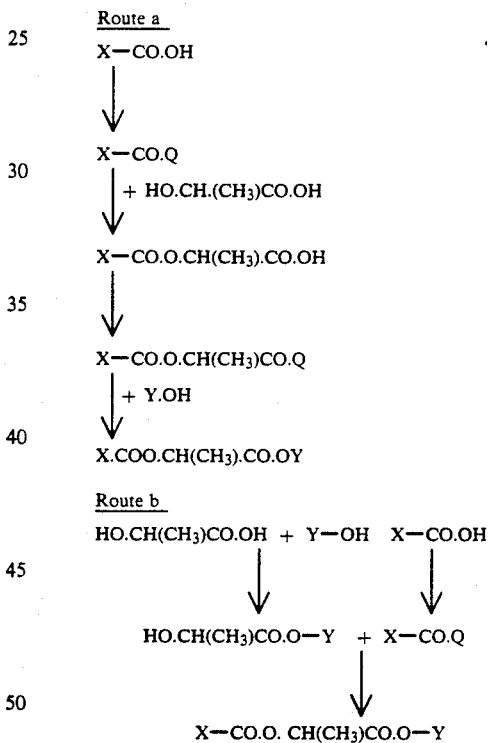

Preferably the compounds of Formula I are made by Route b.

The esterification steps are carried out by steps which are well known to those skilled in the art, e.g. in the presence of a suitable base such as triethylamine.

Method 2

An alternative esterification route, again using lactic acid is route C below:

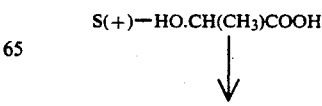

-continued

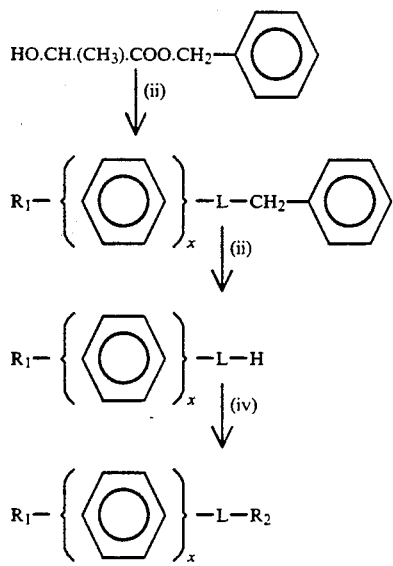

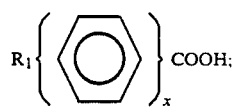

NN'-dicyclohexylcarbodiimide (DCC), 4-(N-pyrrolidino)-pyridine (N-PPy), CHCl$_2$
(iii) 5% Pd-C, ethyl acetate, hydrogen.
(iv) R$_2$OH, DCC, N-PPy, CH$_2$Cl$_2$.

Method 3

In some cases problems may be encountered in the use of the difunctional lactic acid, so alternative routes d and e below may be used, which employ a commercially available alkyl lactate, e.g. S—(—)—HO.CH.(CH$_3$).CO$_2$.C$_2$H$_5$. By these routes R$_2$ will be the alkyl group of the alkyl lactate. Routes d and e are particularly suited to the preparation of compounds of Formula I containing a trans-cyclohexyl ring, as exemplified below:

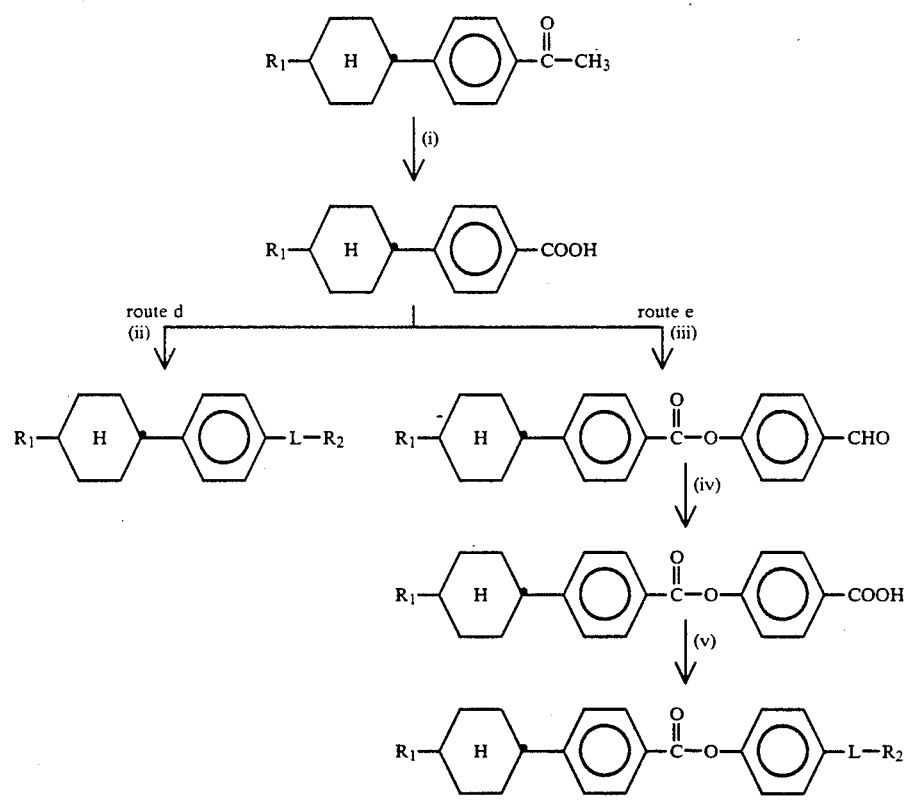

where
—L—=—COO—CH(CH$_3$)COO—
R$_1$=alkyl or alkoxy, e.g. C$_8$H$_{17}$O
R$_2$=alkyl, substituted alkyl, cycloalkyl or phenyl
x=1 or 2
(i) 20% Cs$_2$CO$_3$, 90% MeOH, pH 7; Ph.CH$_2$Br, DMF
(ii) 

(i) Br$_2$, NaOH, Dioxan; H$^+$
(ii) DCC, R$_2$-3-(—)-lactate, N-PPy, CH$_2$Cl$_2$
(iii) DCC, 4-hydroxybenzaldehyde, N-PPy, CH$_2$Cl$_2$
(iv) CrO$_3$ oxidation.
(v) similar to (ii).

Method 4

A method suitable for the preparation of terphenyls of Formula I is route f exemplified below:

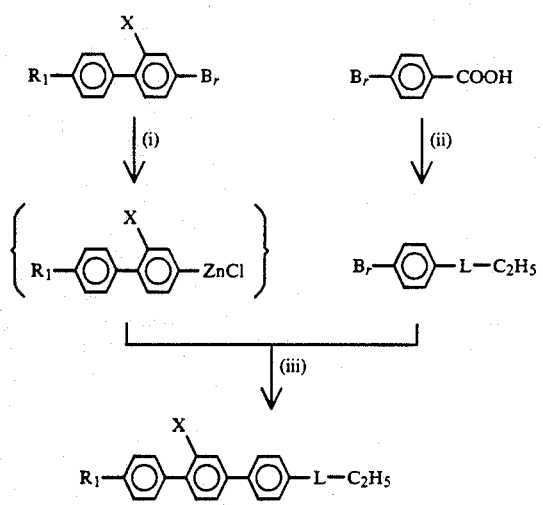

(i) when X=F; n-BuLi, ether, −35° C., 20 min; ZnCl₂, THF, N₂
  when X=H; n-BuLi, ether, −5° C. to −10° C., 45 min; ZnCl₂, THF, N₂
(ii) S-(−)-ethyl lactate, DCC, N-PPy, CH₂Cl₂
(iii) Pd[Ph₃P]₂Cl₂ di-isobutylaluminium hydride, THF, N₂

The various carboxylic acids X—COOH and phenols/alcohols Y—OH, and compounds analogous to the various starting materials or intermediates of routes c, d, e and f are known or may be obtained from known compounds by a simple literature route, for example carboxylic acids may be obtained from the corresponding nitriles by hydrolysis.

Examples of such compounds are those having the generalised structures listed below in Table 3, wherein R₂ and R₂ are as defined above. To prepare compounds of Formula I having a required substitution pattern, appropriately substituted analogues of these compounds may be used.

TABLE 3
Phenols

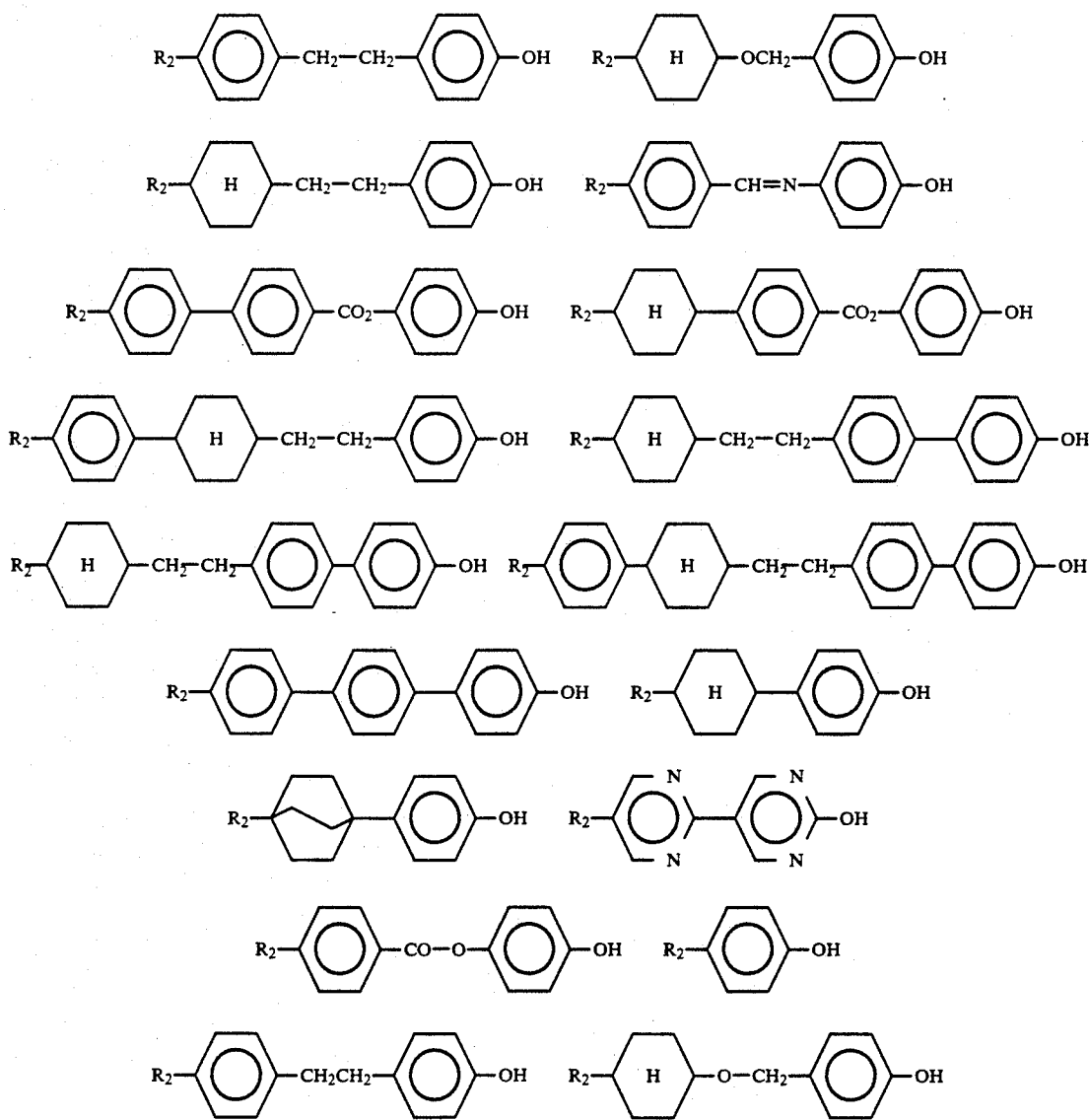

TABLE 3-continued
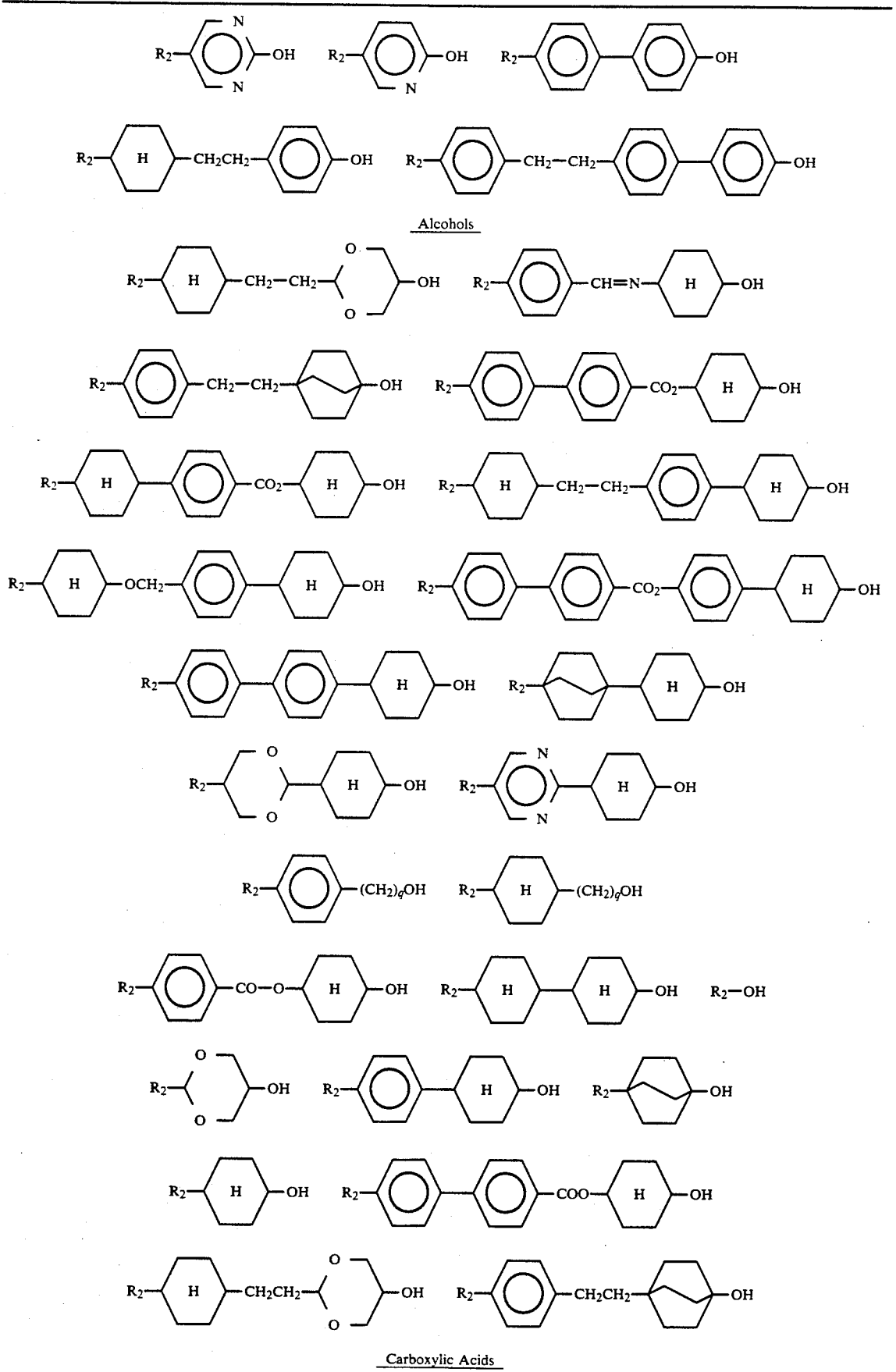
Alcohols
Carboxylic Acids

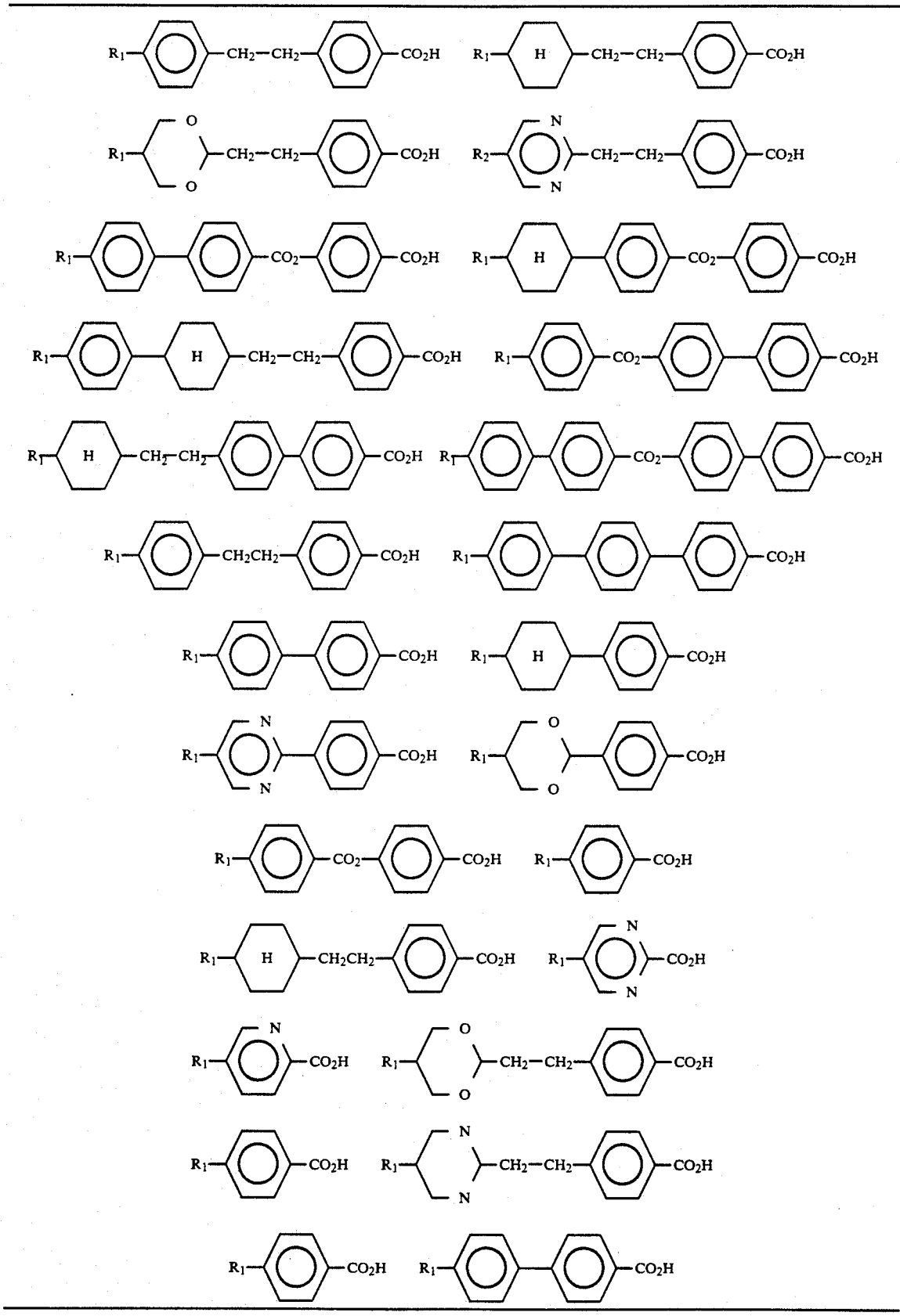
TABLE 3-continued
The compounds of Formula I may be isolated in an optically active (chiral) form, in which case the starting lactic acid in Routes (a) to (f) is the corresponding (S)- or (R)- isomer, or in a racemic form, in which case the starting lactic acid is racemic. All forms of lactic acid are commercially available.

Where an optically active product is required from routes a to f, the intermediate products, as well as the final products, are checked to ensure that their optical activity is not destroyed by racemisation during the esterification steps.

The compounds of the invention may show one or more of the desirable ferroelectric tilted S* phases with a high Ps referred to above by themselves and in such cases may be used as hosts ferroelectric liquid crystal materials. Some of the compounds of the invention may even show ferroelectric S*c phases at room temperature, for example some of the compounds listed in Table 11. Alternatively compounds of the invention which show a high Ps by themselves may be mixed with one or more other compounds of the invention to produce a ferroelectric mixture with a melting point lower than any of the individual compounds, by the well known cryoscopic effect.

Their principal use however is normally as a chiral copant to induce or improve a ferroelectric liquid crystal phase in a host material. The host may itself show a tilted S* phase, or may show such a phase when mixed with one or more compounds of Formula I. In such a case the compound of may or may not itself show a smectic phase. The mixing of one or more compounds of the invention with a host may improve a number of properties of the host material, for example the Ps, the temperature range of S* phases, or the pitch of the helical or twisted configuration of the S* phase.

One of the main advantages of the compounds of the invention is their ability to induce a high Ps in a tilted smectic mixture. It is believed that this may be due to the fact that free rotation of the chiral centre in the α-hydroxy carboxylic acid group relative to the 'molecular core' i.e. the group X or Y, or the combination of X and Y, is hindered, largely by the bonding of the chiral centre to the molecular core by ester links (—COO— and —OOC—). This is especially so when $S^7$ and/or $S^8$ are single covalent bonds so that a ring is linked to the chiral centre directly by an ester link.

When a ring in the molecular core is next to the α-hydroxycarboxylic acid group the presence of bulky substituents on ring positions adjacent to the acid group also sterically hinders rotation of the chiral centre relative to the core and may also contribute to the inducement of a high Ps, but this latter effect is less reliable.

This provides a method of determining the usefulness of a compound of the invention, for example measurement of the Ps of the compound. In practice the Ps of a solution of the compound in a host material, e.g. a racemic smectic host which shows a Ps of ca 0 without any of the compound is measured, and an 'extrapolated Ps' for the pure compound of the invention is derived from this by known methods. It has been observed that in many cases a high extrapolated Ps is found in a compound of Formula I which shows a high optical rotation angle.

A wide range of suitable host materials is known, with which compounds of the invention may be mixed. Some examples are:

(a) The compounds and compositions disclosed in European Patent Application 0110299A2.

(b) The compounds and compositions disclosed in Mol Cryst Liq Cryst 37, 157 (1976), e.g. esters having a central core of the structure:

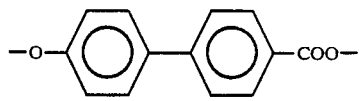

(c) The known compounds of formula:

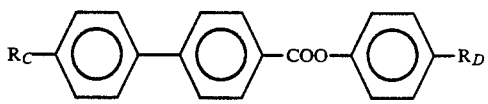

(or mixtures of them, which may be a racemic mixture) where $R_C$ and $R_D$ independently represent n-alkyl or n-alkoxy at least one of which is a chiral group. For example where $R_C = n-C_8H_{17}$ and $R_D = (+)-2$ methylbutyl the compound is commercially available from BDH Chemicals Ltd, Broom Road, Poole, Dorset, UK.

(d) The compounds and compositions disclosed in UK Patent Application 8501509, for example those of formulae Ia to In on P2 of that application such as:

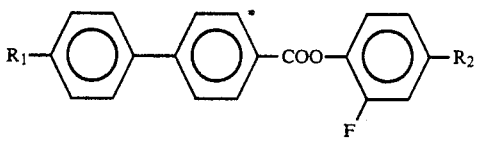

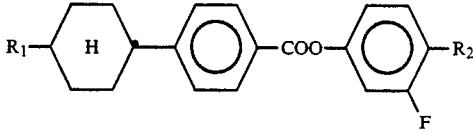

(e) The known compounds, or mixtures thereof, having a formula

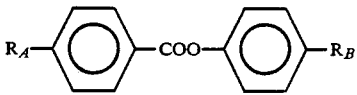

where one of $R_A$ and $R_B$ represents $C_{5-12}$ n-alkoxy and the other represents $C_{7-12}$ n-alkyl or n-alkoxy. These compounds are non chiral.

(f) The known compound PG 495

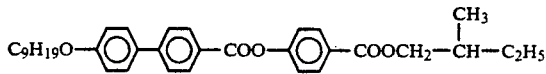

(g) The known compounds

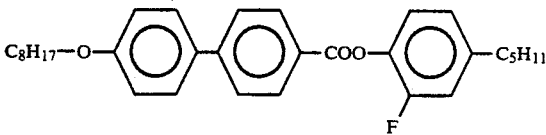

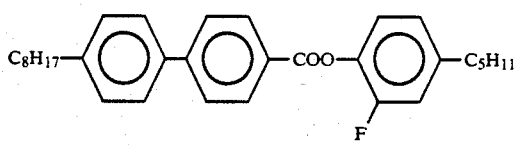

or mixtures of them.

Both (f) and (g) above are available for BDH Chemicals Ltd.

Other suitable smectic host materials which may be mixed with compounds of Formula I will be apparent to those skilled in the art.

A mixture which contains one or more compounds of the invention, and exhibits a chiral smectic phase may have added to it one or more additives to engineer other preferred properties for a particular device such as viscosity, dielectric anistropy, birefringerence, pitch, elastic constants, melting point, clearing point etc. Additives showing a weak longitudinal dipole moment (e.g. compounds containing alkyl and/or alkoxy terminal groups) are preferred. Preferably they show a lateral dipole moment (e.g. by containing a lateral halogen, $CF_3$ or $CN$ substituent).

In the field of smectic liquid crystal chemistry relatively little is known about the structural requirements for miscibility and it is therefore somewhat difficult to predict which compounds will form stable mixtures with smectic phases. It may thus be necessary to carry out some relatively straightforward experiments to determine whether a particular combination of compounds such as a host, or additives as discussed above will form a stable mixture. Such experiments may in many cases comprise no more than melting a combination of compounds together (if they are not liquid at room temperature) and observing the appearance or otherwise of smectic phases by known methods such as optical microscopy.

Most research to date in this relatively new field has been concentrated on finding good working combinations of host and dopant and it is expected that future work will be directed towards retiring and improving those combinations with additives.

There are some signs that compounds which have the same or a closely related molecular core or combination of cyclic groups and linking groups in their structure will be misable, for example the compound PG 495 is miscible with its analogue having the 2-methylbutyl ester group replaced by a lactate-ethyl ester. That this principle is not absolutely rigid is demonstrated by the wide range of compounds which are miscible with PG 495 and RCE 8 in tables 7 to 12.

Some possible examples of additives are given in Tables 4, 5 and 6 below, but it must be understood that this is only a general guide and experiments should be carried out in all cases to investigate suitability.

Examples of the families of compounds which may be added to a mixture containing a compound of the invention together with one or more of the tilted smectic compounds or materials such as (a) to (e) described above to produce a room temperature smectic C phase are shown in Table 4.

TABLE 4

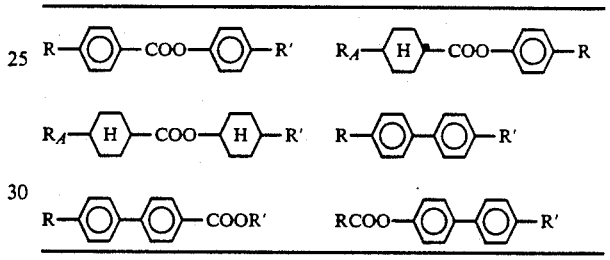

where R and R' are alkyl or alkoxy and $R_A$ is alkyl. Preferably R is $C_{5-12}$ n-alkyl or n-alkoxy or $C_{5-12}$ branched alkyl or alkoxy containing an asymmetrically substituted carbon atom e.g. 2-methylbutyl.

Examples of low melting and/or low viscosity additives are the compounds shown in Table 5.

TABLE 5

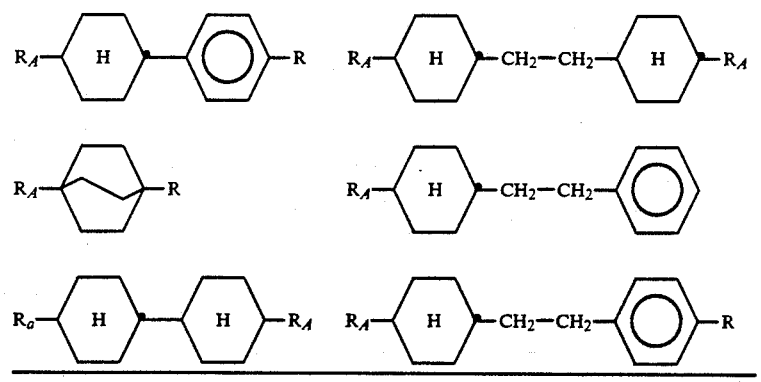

where each R is independently alkyl or alkoxy, e.g. $C_{1-18}$ n-alkyl or n-alkoxy, and each $R_A$ is independently alkyl, e.g. $C_{1-18}$ n-alkyl.

Examples of high clearing point additives are the compounds shown in Table 6.

TABLE 6

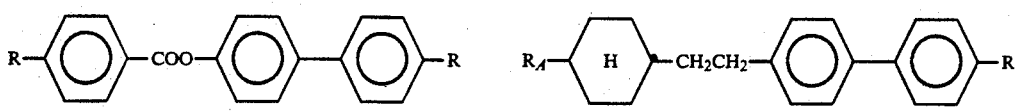

TABLE 6-continued

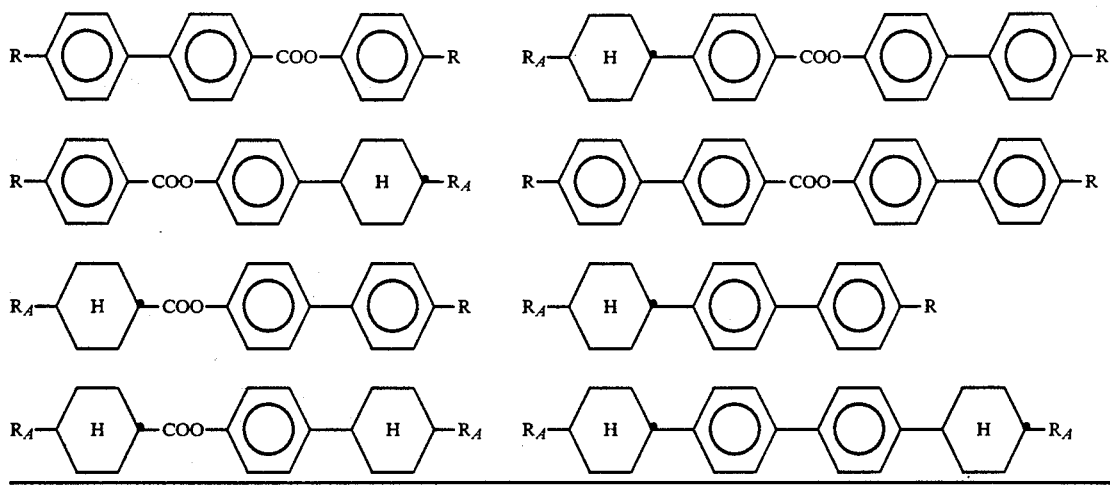

where R is alkyl or alkoxy, e.g. $C_{1-12}$ alkyl or alkoxy and $R_A$ is alkyl, e.g. $C_{1-12}$ or a fluorinated analogue of one of these compounds.

An example of a mixture according to this aspect of the invention is the following:

| | |
|---|---|
| (i) A component comprising one or more of the compounds (a) to (g) described above. | 25–75 mol % |
| (ii) A component comprising one or more of the compounds in Table 4 above. | 0–30 mol % |
| (iii) A component comprising one or more of the compounds in Table 5 above. | 0–30 mol % |
| (iv) A component comprising one or more of the compounds in Table 6 above. | 0–30 mol % |

The amount of each compound made up to 100% with one or more compounds of the invention contained in the mixtures of the invention depends on the properties required of the mixture, including the Ps value and the pitch of the molecular configuration in the chiral smectic phase. When the compound of the invention induces an increased Ps in the host, the Ps value induced generally increases with the amount of the compound of which is present in the host.

Alternatively or additionally some compounds of the invention may be capable of acting as hosts, in which case they may be optically active or racemic, to which a suitable dopant may be added (which may be a different compound of Formula I), and other additives such as those exemplified in Tables 4, 5 and 6 may be added to the mixture.

Where a mixture is formed by mixing a first component comprising one or more compounds of the invention with a second component which may itself comprise one or more of the invention and which is also chiral the respective molecular twist senses of or induced by the two components may be the same or opposed. Where the two senses are opposed the resultant mixture shows a longer helical pitch than those of the two components (if separately chiral smectic). The sense of the twist is the same as the component of shorter pitch, i.e. the more powerful twist, for a mixture of equal amounts of two chiral smectic components. By means of this principle the pitch of a mixture may be tuned as appropriate for its intended application. It is possible by this method to produce a mixture in which the respective twist sense of the components cancel each other out, to produce a mixture of effectively infinite pitch.

In a mixture it is also possible for the respective senses of polarisation (as defined in FIG. 1), i.e. (+) or (−) to be the same or opposed and hence additive or subtractive.

Hence it is possible to prepare a mixture in which the twist senses of the of the components are opposed and cancel each other out, whilst the polarisations are additive.

Liquid crystal mixtures which show a tilted S* ferroelectric liquid crystal phase, and which incorporate one or more compounds of the invention, either as dopant or host or both and optionally including one or more of the other compounds or types of compounds discussed above, constitute another aspect of the invention.

Liquid crystal ferroelectric materials incorporating a compound of the invention may be used in known liquid crystal electro-optical devices, e.g. processing, storage and display devices, which utilise the properties of S* mesophase.

An example of such a device is the "Clark Lagerwall Device", described in Reference 1, and also in "Recent Developments in Condensed Matter Physics" 4, p309, (1981) (Reference 3). The physics of this device, and methods of constructing one are well known. In practice such a device usually consists of two substrates, at least one of which is optically transparent, electrodes on the inner surfaces of the substrates and a layer of the liquid crystal material sandwiched between the substrates.

Such a device, when incorporating a compound of Formula I, also constitutes an aspect of the invention.

The Clark Lagerwall device uses a layer of liquid crystal material between the substrates of a thickness comparable to or less than the helical pitch of the S* configuration, which causes the helix to be unwound by surface interactions. In its unwound state the material has two surface stabilised states with director orientations (i.e. molecular tilt direction) at twice the tilt angle to one another, and also permanent dipole orientations perpendicular to the substrates but in opposite directions.

An alternative approach to providing cells for a Clark-Lagerwall device having a thicker layer of liquid crystal material is to use an applied electric field to induce homogenous alignment through interaction with the dielectric anistropy of the liquid crystal material. This effect requires a chiral smectic material having a negative dielectric anisotropy, e.g. provided by incorporation of a compound having a lateral halogen or cyano substituent. Such a compound may itself be chiral or non-chiral and smectic or non-smectic.

In general chiral smectic C materials ($S_C^*$) are used in these displays because these are the most fluid, but in principle the more ordered chiral smectics could also be used. A pleochroic dye may also be incorporated in the liquid crystal material to enhance the electro-optic effect.

Such a device incorporating compounds of Formula I offers the possibility of a high switching speed of a few microseconds—as demonstrated in Reference 3—together with bistable storage capability; and so is likely to have important applications in displays, optical processing devices, and optical storage devices. In particular this facilitates the construction of the electro-optical device in the form of a large screen, e.g. 30 cm by 20 cm, suitable for use in visual display units, portable computers etc.

Examples of the preparation and properties of compounds embodying the present invention will now be described. In the following examples certain abbreviations and symbols used having the following meanings:

h = hours;
g = grammes;
mp = melting point;
bp = boiling point;
hplc = high pressure liquid chromatography;
$C-S_{A,B,C}$ = crystalline solid to smectic A, B, C. liquid crystal transition temperature °C.
$[\alpha]^{24}_D$ = optical rotation angle at 24° C. using sodium-D line
Hosts: RCE8 is racemic

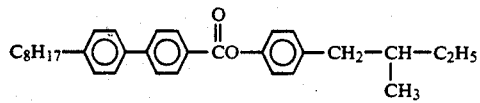

RPG495 is racemic

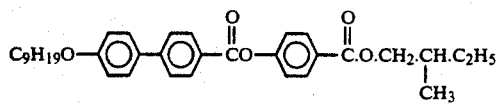

Ps(nC cm$^{-2}$) = Spontaneous Polarisation
$\mu_{eff(D)}$ = Magnitude of the effective dipole moment contributing to Ps, estimated using $\mu_{eff}$ = (Ps MW)/(NA $\rho$)
MW = molecular weight
NA = Avogadro's number
$\rho$ = density, taken to be 1000 Kgm$^{-3}$
Ps and $\mu_{eff}$ are extrapolated to 100 mol % concentration from mixtures containing approx 10 mol % concentration.

All data on Ps, $\mu$eff, tilt angle, sense of polarisation is given at a temperature of 10° C. below the $S_A$-$S_C^*$ transition unless otherwise stated.

The dopant's sense of polarisation is defined as in FIG. I.

EXAMPLE 1

The preparation of compounds of generalised Formula:

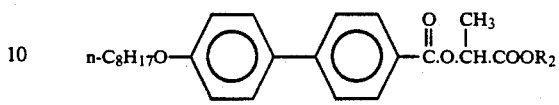

using route b.

Step 1a: Preparation of (S)-propyl lactate

To a stirred suspension of Amberlite IR-120(H) (20.0 g) in sodium-dried benzene (300 cm$^3$) was added (S)-(+)-lactic acid (53.0 g, 0.59 mol) and propanol (75.0 g, 1.25 mol). The stirred reaction mixture was then heated, under reflux conditions, for 5 h, with the water being collected in a Dean and Stark apparatus. When cooled, the resin was filtered off and washed with two portions (25 cm$^3$) of benzene. The benzene filtrate was then shaken with potassium carbonate (5.0 g), filtered and washed with a little benzene.

Distillation under reduced pressure (water pump) afforded the (S)-propyl lactate as a colourless liquid, 31.5 g (44%) bp 69°-73° C. (water-pump) From the nmr spectrum, the (S)-propyl lactate was still contaminated with propanol. This was removed by azeotropic distillation with toluene.

The product was then again distilled, under reduced pressure (water-pump) to afford the (S)-propyl lactate as a colourless liquid, 23.0 g (32%), bp 69°-71° C. (water pump). The product was free from propanol.

Step 1b: Preparation of (S)-Propyl 2-(4'-octyloxy biphenyl-4-carbonyloxy) propanoate 4'-n-Octyloxybiphenyl-4-carboxylic acid (5.9 g, 0.0153 mol) was gently heated, under reflux conditions, with an excess of freshly distilled thionyl chloride (30 cm$^3$) for 3 h. The unreacted thionyl chloride was removed by distillation under reduced pressure and the crude acid chloride was then dissolved in dry dichloromethane (10 cm$^3$). The solution of the acid chloride was then added, dropwise, to a stirred solution of the (S)-propyl lactate (2.25 g—prepared as in Step 1a) and dry triethylamine (2 cm$^3$) in dry dichloromethane (10 cm$^3$). The reaction mixture was then stirred at room temperature for 16 h.

The cold reaction mixture was diluted with dry dichloromethane (20 cm$^3$) and washed with dilute hydrochloric acid, water and then finally dried over magnesium sulphate.

The crude ester was purified by column chromatography on silica gel, using chloroform as the eluent. Several recrystallisations from ethanol afforded the (S)-propyl 2-(4'-octyloxybiphenyl-4-carbonyloxy) propanoate as a crystalline solid, 2.5 g (37%), mp 58° C.

The purity of the product was checked by hplc (reverse phase; various water/methanol mixtures). The chemical structure of the product was confirmed by a combination of the following techniques:

1. $^1$Hnmr spectroscopy (using a Jeol J NM-PM x 60 model spectrometer);
2. Infra-red spectroscopy (using a Perkin-Elmer 457 model grating spectrophotometer);

3. Mass spectrometry (using an AEI MS 902 model mass spectrometer).

The optical purity of the product was checked by nmr spectroscopy using chemical shift reagents.

EXAMPLE 2

(S)-Ethyl 2-(4'-octyloxybiphenyl-4-carbonyloxy) propanoate was prepared by an analogous procedure to that of Example 1. The product, whose composition and purity were checked as in Example 1, showed C-$S_A$=39° C. and $S_A$-I=42.0° C.

The (S)-ethyl lactate used in Example 2 was obtained commercially from Aldrich Chemical Co Ltd, Gillingham, Dorset, UK.

EXAMPLE 3

(S)-methyl 2-(4'-octyloxybiphenyl-4-carbonyloxy) propanoate was prepared by an analogous procedure to that of Example 1. The composition and purity of the product were checked as in Example 1. The product showed C-I=57° C. and $S_A$-I=(49.2° C.) (monotropic).

The (S)-methyl lactate used in Example 3 was obtained commercially from Aldrich Chemical Co Ltd, Gillingham, Dorset, UK.

EXAMPLE 4

(S)-n-Butyl 2-(4'-octyloxybiphenyl-4-carbonyloxy) propanoate was prepared by an analogous procedure to Example 1. The product, whose composition and purity were checked as in Example 1, showed a melting point of 51° C.

The (S)-n-Butyl lactate used in Example 4 was prepared in a manner analogous to Step 1a above. This compound was found to have a bp of 86°-89° C. (water pump).

EXAMPLE 5

Method 2, Route C

Step (i) Preparation of

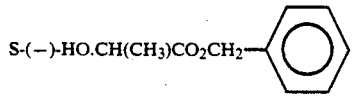
(A)

S-(+)- Lactic acid (18.0 g) was dissolved in methanol (360 cm$^3$) and water (40 cm$^3$) was added. The solution was titrated to pH 7.0 (pH meter or pH paper) with a 20% aqueous solution of caesium carbonate (ca. 160 cm$^3$). The solvent was removed under reduced pressure at 50° C. and the residue was re-evaporated twice from N,N-dimethylformamide (DMF) (2×100 cm$^3$) at the same temperature. The white solid caesium salt obtained was stirred with benzyl bromide (34.2 g) in DMF (300 cm$^3$) for 15 h. The caesium salt was filtered off, the filtrate was concentrated and then ether was added to the residue (150 cm$^3$). The organic layer was washed successively with water (100 cm$^3$), saturated NaHCO$_3$ (500 cm$^3$) and water (100 cm$^3$) and finally dried (MgSO$_4$). After removal of the solvent, theresidual liquid was distilled under reduced pressure to afford the product as colourless liquid, yield 28.8 g (80%), bp 96° C. (0.05 mm Hg) $[\alpha]_D^{24}$−12.9 (c 0.01, CHCl$_3$).

Note: Commercially available S-(+)-Lactic acid (Aldrich) was redistilled before it was used.

Ref. S. S. Wang, J.O.C., 41, 3258 (1976).

Step (ii) Preparation of

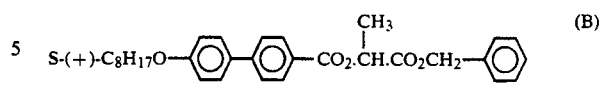
(B)

To a stirred mixture of 4-octyloxybiphenylyl-4'-carboxylic acid (10.8 g), S-(−)-benzyl lactate (A) (5.9 g) and 4-pyrrolidinopyridine (N-PPY) (0.49 g) in sieve-dried CH$_2$Cl$_2$ (250 cm$^3$), a solution of N,N-dicyclohexylcarbodiimide (DCC) (7.5 g) in sieve dried CH$_2$Cl$_2$ (50 cm$^3$) was added slowly. The reaction mixture was stirred for 5 h at room temperature. The N,N-dicyclohexylurea (DCU) was filtered off and the filtrate was washed successively with water (100 cm$^3$), 5% aqueous acetic acid (100 cm$^3$), water (2×100 cm$^3$) and finally dried (MgSO$_4$). After removal of the solvent, the crude diester was purified by column chromatography using silica gel and dichloromethane: petroleum fraction (bp 60°-80° C.) (4:1) as eluent. The product was crystallised from ethanol. Yield 11.1 g (69%), mp 62.5° C., $[\alpha]_D^{24}$+24.7 (c 0.01, CHCl$_3$).

Ref. A. Hassner & V. Alexanian, Tetrahedron Letters 46, 4475, (1973).

Step (iii) Preparation of

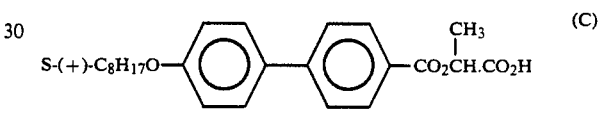
(C)

Compound (B) (11.0 g) was dissolved in ethyl acetate (150 cm$^3$) 5% Pd on charcoal (200 mg) was added and the mixture was stirred under an atmosphere of hydrogen overnight. After hydrogenation, (500 cm$^3$ of hydrogen consumed) was completed, the catalyst was filtered off and the filtrate was evaporated to dryness. The colourless solid residue (singl spot by tlc) was crystallised from petroleum fraction (bp 60°-80° C.) to give the required carboxylic acid (C) as colourless needles. Yield 8.6 g (95%), mp 126° C., $[\alpha]_D^{24}$+40.8° (c 0.01 CHCl$_3$).

Step (iv) Preparation of

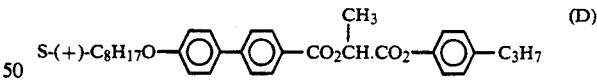
(D)

Compound (D) was prepared using the method of esterification as illustrated in step (ii) of Route C above, by taking compound (C), (1.1 g), 4-propylphenol (0.42 g), N-PPY (42 mg) and DCC (0.64 g) in sieve dried CH$_2$Cl$_2$ (35 cm$^3$). Yield 0.84 g (58%), mp 78.0° C., $[\alpha]_D^{24}$+50.0° (c 0.01 CHCl$_3$).

EXAMPLE 6

Method 3, Routes d and e

Step (i) Preparation of

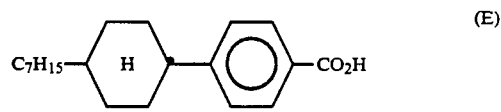
(E)

A solution of sodium hypobromite was prepared by dropwise addition of bromine (48.5 g) into a solution of sodium hydroxide (44 g) in water (200 cm$^3$) at 5°-10° C. This solution was then added slowly to a stirred solution of the ketone

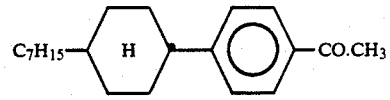

(20 g) in dioxan (300 cm$^3$) at a temperature of 50°-55° C. for 30 min. The mixture was diluted with water (500 cm$^3$) and the organic solvent was distilled off. The residual hot mixture was filtered to remove unreacted ketone and the filtrate was allowed to cool to room temperature. The carboxylic acid salt was then acidified with concentrated hydrochloric acid and the crude acid obtained was filtered off, washed with water and dried in air. The product was crystallised from toluene. Yield 6.4 g (32 g), Liquid crystal transitions: S 161° C. Sc 190° C. N 190° C. I.

Ref. A. I. Vogel "Textbook of Practical Organic Chemistry" 4th Mdn, p476 (1973) (pub Longman Group Ltd.).

Route d

Step (ii) Preparation of (F)

crystallised from ethanol. Yield 1.75 g (59%) C 94.5° K. 192.0° C. I.

Step iv Preparation of

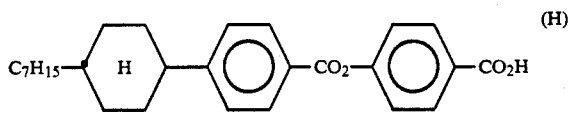

The oxidising agent was initially prepared by the dropwise addition of concentrated sulphuric acid (0.5 cm$^3$) to a stirred solution of chromium trioxide (0.42 g) in water (3.5 cm$^3$) at 0° C. A suspension of the aldehyde (G) (1.23 g) in acetone (15 cm$^3$) and benzene (8 cm$^3$) was cooled to 0°-5° C. and the oxidising agent prepared above was added dropwise with vigorous stirring, at such a rate that the temperature of the reaction mixture was maintained at about 20° C. The reaction mixture was stirred for 20 h at room temperature, The dark green reaction mixture was diluted with water (50 cm$^3$) and the organic solvents were removed in vacuo. Then 10% aqueous sulphuric acid (10 cm$^3$) was added and the precipitate was filtered off, washed with water until the washings were neutral to litmus, and then washed with a small amount of ethanol and dried in air. The product (single spot tlc) was crystallised from ethyl acetate. Yield 0.90 g (71%); C 21.0° C. S 225° C. N>300° C.

Ref. Crg. Syn, 45, 77 (1965).

Step v Preparation of

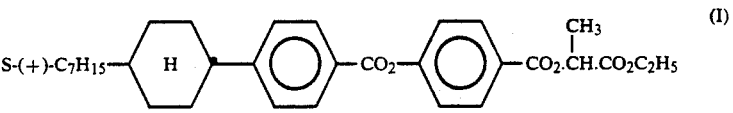

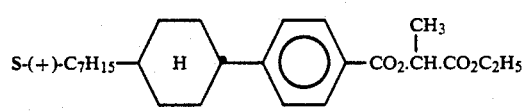

Compound (F) was prepared as described in Route c, step (ii) above, using Compound (E) (1.0 g), S-(−)-ethyl lactate (0.42 g), N-PPY (49 mg) and DCC (0.74 g) in sieve dried CH$_2$Cl$_2$ (35 cm$^3$). The product was crystallised from methanol at −78° C. Yield 0.80 g (60%), mp 25.0° C.

[α]$_D^{24}$ +19.5° C. (c 0.01 CHCl$_3$)

Route e

Step (iii) Preparation of

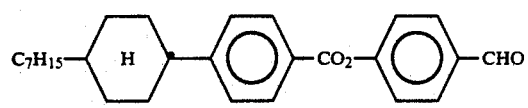

Compound (G) was prepared as described in Route c, step (ii) above using Compound (E) (2.2 g), 4-hydroxybenzaldehyde (0.98 g) N-PPY (87 mg) and DCC (1.65 g) in sieve dried CH$_2$Cl$_2$ (50 cm$^3$). The product was Compound (I) was prepared as described in Route c, step (ii) using Compound (H) (0.85 g), S-(−)-ethyl lactate (0.26 g), N-PPY (30 mg) and DCC (0.46 g) in sieve dried CH$_2$Cl$_2$ (30 cm$^3$). The product was crystallised from ethanol. Yield 0.55 g (53%). Liquid crystal transitions: C (58.5° C.) 83.0° C. S$_A$ 117.5° C. Ch 119.1° C. BP 120.0° C. I (BP=Blue Phase) [α]$_D^{24}$ +9.4° (c 0.01 CHCl$_3$).

EXAMPLE 7

Method 4 Route f

Step (ii) Preparation of

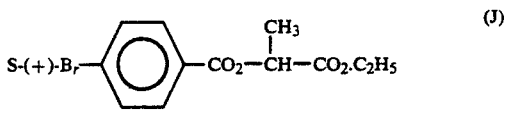

Compound (J) was prepared as described in Route c, step (ii) by taking 4-bromobenzoic acid (22 g), S-(−)ethyl lactate (14.2 g) N-PPY (1.63 g) and DCC (25.0 g) in sieve dried CH$_2$Cl$_2$ (400 cm$^3$). The product was distilled under reduced pressure. Yield 20.1 g (61%) bp 118° C. (0.05 mmHg), [α]$_D^{24}$ +22.8 (c 0.01 CHCl$_3$).

Step (i) and (iii) Preparation of

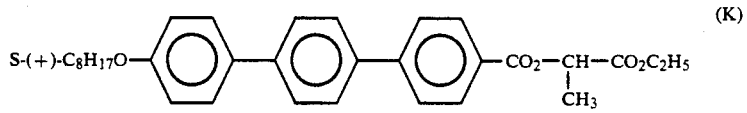

(K)

A solution of 9.5M butyllithium in hexane (1.1 cm$^3$) in sodium dried ether (10 cm$^3$) was added dropwise to a stirred solution of 4-bromo-4'-octoxybiphenyl (3.4 g) in sodium dried ether (80 cm$^3$) at $-10°$ C. After the addition was complete the reaction mixture was kept at $-5°$--$10°$ C. for 45 min, and then a solution of anhydrous zinc chloride (1.9 g) in sodium dried THF (25 cm$^3$) was added over a period of 10 min and the reaction mixture was stirred for 1 h at room temperature.

The Pd catalyst was prepared in a separate flask by treating a soloution of dichloro bis(triphenylphosphine) palladium (II) (0.26 g) in sodium dried THF (20 cm$^3$) with 1.0M diisobutylaluminium hydride in hexane (1.1 cm$^3$). To this catalsyst were added Compound (J) (2.36 g) in sodium dried THF (10 cm$^3$) and the solution of 4-octoxybiphenyl-4'-zinc chloride prepared above. The reaction mixture was diluted with ether (50 cm$^3$) and washed with 5% aqueous hydrochloric acid (30 cm$^3$) and water (2×50 cm$^3$) and dried (MgSO$_4$). After removal of the solvent, the product was purified by column chromatography using silica gel and chloroform: petroleum fraction (bp 60°–80° C.) (2:1) as eluent. The product was crystallised from ethanol. Yield 1.2 g (31%). Liquid crystal transitions; C 127.0° C. S$_C$* 158.5° C. S$_A$ 180.2° C. I, $[\alpha]_D^{24}$+33.4° C. (c 0.01 CHCl$_3$).

Ref. E. Negishi, A. O. King and N. Okukado, J.O.C., 42, (10), 1821 (1977).

Some properties of compounds of the invention prepared using the routes described above are listed in Tables 7 to 12 below:

TABLE 7

Compounds of the formula:

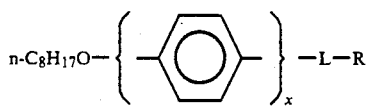

prepared by route c. Used in RCE8 host

| X | R | mp(°C.) | $[\alpha]_D^{24}$ | Ps | $\mu_{eff}$ | Tilt Angle° | Sense of Pol. |
|---|---|---------|-------------------|----|----|-----|-----|
| 1 | —CH—(phenyl) | 29 | +18.8 | — | — | — | — |
| 1 | —(phenyl)-(phenyl)—C$_3$H$_7$ | 95 | +49.4 | No Sc* phase in 10% soln bi-phase regions formed | | | |
| 1 | —(phenyl)-(phenyl)-(phenyl)—C$_5$H$_{11}$ | 106.0 | +45.3 | — | — | — | — |
| 2 | —CH$_2$—(phenyl) | 62.5 | +24.7 | 51 | 0.12 | 14.5 | (—) |
| 2 | —CH$_2$.CH$_2$—(phenyl) | 47 | +22.4 | 79.5 | 0.2 | 14.5 | (—) |
| 2 | CH$_2$—(phenyl)—F | 67 | +28.5 | 20 | 0.05 | 13.5 | (—) |
| 2 | —(phenyl)—C$_3$H$_7$ | 78 | +50 | 160 | 0.42 | c15 | (—) |

TABLE 7-continued

Compounds of the formula:

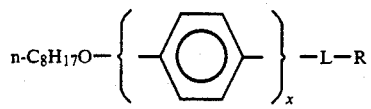

prepared by route c. Used in RCE8 host

| X | R | mp(°C.) | $[\alpha]_D^{24}$ | Ps | $\mu_{eff}$ | Tilt Angle° | Sense of Pol. |
|---|---|---------|-------------------|-----|-------------|-------------|---------------|
| 2 | 3-F-phenyl-C$_3$H$_7$ | 63.5 | +36.8 | 108 | 0.29 | 15.5 | (—) |
| 2 | cyclohexyl-C$_3$H$_7$ | 85.5 | +38.2 | 101 | 0.27 | c16 | (—) |
| 2 | phenyl-C$_5$H$_{11}$ | 78 | +44.4 | 149 | 0.38 | 14 | (—) |
| 2 | bicyclo-C$_5$H$_{11}$ | 116.0 | +33.2 | 96 | 0.24 | 14 | (—) |
| 2 | phenyl-COC$_2$H$_5$ | 106 | +31.5 | — | — | — | — |
| 2 | naphthyl-C$_7$H$_{15}$ | 114 | +58.4 | 80* | 0.23 | 9* | (—) |
| 2 | H | 126 | +40.8 | — | — | — | — |
| 2 | —CH$_3$** | (C(49.2) S$_A$57 I) |  | 67 | 0.14 | 16 | (—) |
| 2 | —C$_2$H$_5$** | (C(39.5) S$_A$42 I) |  | 74 | 0.15 | 17 | (—) |
| 2 | —C$_4$H$_9$** | 51 | +33.4 | 75 | 0.15 | 13.5 | (—) |

$C_8H_{17}$—{phenyl}$_x$—L—R analogue:

| 2 | —C$_2$H$_5$ | — | — | 66 | 0.14 | 15 | (—) |

*figures measured 5° C. below S$_A$-S$_C$ transition.
**prepared using route b also, see Examples 2, 3 and 4 above.

TABLE 8

Compounds of the formula:

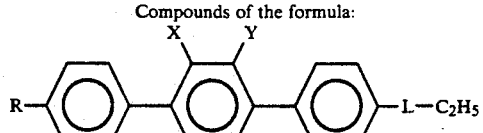

Prepared by route f above. Used in RCE8 host.

| R | X | Y | C—S$_C$,S$_A$ | S$_C$—S$_A$ | S$_A$—I | $[\alpha]_D^{24}$ | Ps | $\mu_{eff}$ | Tilt Angle° | Sense of Pol |
|---|---|---|--------------|-------------|---------|-------------------|-----|-------------|-------------|--------------|
| C$_8$H$_{17}$O | F | H | 40 | — | 116 | +30.2 | 104 | 0.27 | 13.5 | (—) |
| C$_8$H$_{17}$O | H | H | 127 | 158.5 | 180.2 | +33.4 | 99 | 0.25 | 15 | (—) |
| " | " | " | Pure material |  |  |  | 124 | 0.31 | 24 | (—) |

TABLE 8-continued

Compounds of the formula:

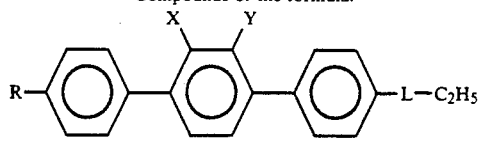

Prepared by route f above. Used in RCE8 host.

| R | X | Y | C—$S_C,S_A$ | $S_C$—$S_A$ | $S_A$—I | $[\alpha]_D^{24}$ | Ps | $\mu_{eff}$ | Tilt Angle° | Sense of Pol |
|---|---|---|---|---|---|---|---|---|---|---|
| $C_5H_{11}$ | H | F | | 66($S_B$) 71(B—A)116 | | — | — | — | — | — |
| $C_5H_{11}$ | H | H | | 130(E) {129E—B / 147B—A} 180 | | +37.6 | — | — | — | — |
| $C_9H_{19}$ | H | H | {68.5 ($S_1$—$S_2$)} {99.0 ($S_2$—$S_C$)} {120 ($S_c$—$S_A$)} | | {150.5 ($S_A$—I)} | +32.1 | — | — | — | — |
| $C_4H_9O$ | H | H | {185.0 (C—$S_E$)} {186.5 ($S_E$—$S_A$)} | {225.0 ($S_A$—I)} | | — | — | — | — | — |

Miscellaneous liquid crystal transitions to denoted phases shown: { }

TABLE 9

Compounds of the formula:

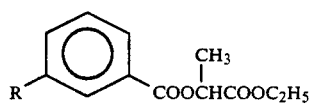

In RCE8 host. Prepared by route c.

| R | C—I | $S_C$—$S_A$ | $S_A$—I | Ps | $\mu_{eff}$ | Tilt Angle° | Sense of Pol | $[\alpha]_D^{24}$ |
|---|---|---|---|---|---|---|---|---|
| $C_8H_{17}O$—⟨⟩—CO— | 20 | — | — | — | — | — | — | +14.4 |
| $C_8H_{17}O$—⟨⟩—⟨⟩—CO— | 72 | (49) | (63.5) | 16 | 0.05 | c̄13.5 | (—) | +3.6 |

TABLE 10

Compounds of the formula:

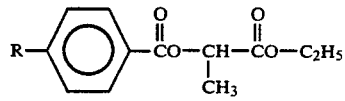

| R | C—$S_A$,I | $S_B$—$S_A$ | $S_A$—Ch | Ch—BP | BP*—I | $[\alpha]_D^{24}$ | Ps | Sense of Pol |
|---|---|---|---|---|---|---|---|---|
| $C_7H_{15}$—⟨H⟩— | 25 | — | — | — | — | +19.5 | 66 | (—) |
| $C_7H_{15}$—⟨H⟩—⟨⟩—CO | 83 | (58.5) | 117.5 | 119.1 | 120 | +9.4 | — | — |

*BP = Blue phase
In RCE8 host, prepared using routes d and e.

TABLE 11

Compounds of the Formula:

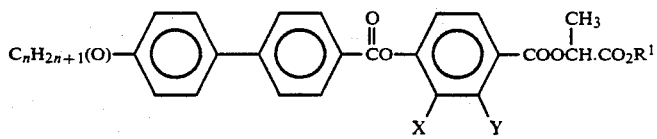

In RCE8 host 10% solution.

Alkoxy derivatives

| n | $R^1$ | X | Y | C—S,$S_C$ | S—$S_C$ | $S_A$—$S_C$ | $S_A$—Ch | $S_A$.Ch—I | D/L* | Ps Sense of Pol | Tilt Angle° |
|---|---|---|---|---|---|---|---|---|---|---|---|
| 8 | $C_2H_5$ | H | H | 75 | (62) | 117.5 | | 163 | L | | |
| 9 | $C_2H_5$ | H | H | 60 | (45) | 122 | | 158 | L | 55.4(−) | 20.5 |
| 9 | $C_2H_5$ | Cl | H | 16+ | −14 | 83.5 | | 117.5 | L | 56.5(−) | 20.0 |
| 9 | $C_2H_5$ | H | Cl | 47.5 | | 48 | 101.7 | 103.5(Ch—I) | L | 47.8(−) | 24.2 |

Alkyl analogues

| n | $R^1$ | X | Y | C—S,$S_C$ | S—$S_C$ | S—$S_A$ | $S_A$—Ch | $S_A$.Ch—I | D/L* | Ps Sense of Pol | Tilt Angle |
|---|---|---|---|---|---|---|---|---|---|---|---|
| 8 | $C_2H_5$ | H | H | 49($S_A$) | $S_B$—$S_A$ | 48.5 | | 10 | | | |
| 9 | $C_2H_5$ | H | H | 48.5($S_A$) | $IS_B$—$S_A$ | 46 | | 129.0 | | | |
| 10 | $C_2H_5$ | H | H | 57 | (35) | 72 | | 124 | L | 35.4(−) | 15.4 |
| 10 | $C_2H_5$ | CL | H | −2 | | 32 | | 83.5 | L | 29.2(−) | 15.1 |
| 10 | $C_2H_5$ | H | Cl | 42 | | | 66 | 69(Ch—I) | L | 35**(−) | 17.2 |

+Crystal-crystal transition at 6° C.
*indicates Optical Chirality, Dextro (D) or Laevo (L)
**20% solution in RCE8

A terphenyl having the structure:

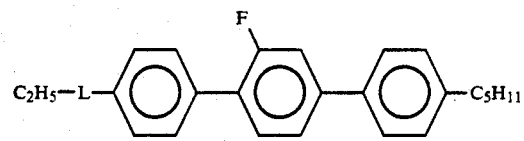

was also prepared, using route c. This compound had the properties: C-S 66° C. $S_B$-$S_A$ 71° C., $S_A$-I 116° C.

A comparison was made of the properties of certain of the compounds described above in a second host material RPG495. These results are listed in Table 12 below:

TABLE 12

| Compound | Ps(1) | Ps(2) | Ps(3) | Tilt Angle | Sense of Pol |
|---|---|---|---|---|---|
| $C_8H_{17}O$—⬡—⬡—L—⬡—$C_3H_7$ | 174 | 135 | 94 | — | — |
| $C_8H_{17}O$—⬡—⬡—L—$C_2H_5$ | 50 | 41 | 28 | 15.5 | (−) |
| $C_8H_{17}O$—⬡—⬡—⬡—L.$C_2H_5$ | 90 | 71 | 38 | — | (−) | where Ps(1) measured 30° C. below transition
Ps(2) measured 20° C. below transition
Ps(3) measured 10° C. below transition An example of the use of a compound of Formula I in a liquid crystal material and device embodying the present invention will now be described with reference to the accompanying drawing, FIG. 2, which is a cross sectional end view of a liquid crystal shutter.

In FIG. 2 a liquid crystal cell comprises a layer 6 of liquid crystal material exhibiting a chiral smectic phase sandwiched between a glass slide 4 having a transparent conducting layer 7 on its surface, e.g. of tin oxide or indium oxide, and a glass slide 5 having a transparent conducting layer 8 on its surface. The slides 4,5 bearing the layers 7,8 are respectively coated by films 10,11 of a polyimide polymer. Prior to construction of the cell the films 10 and 11 are rubbed with a soft tissue in a given direction the rubbing directions being arranged parallel upon construction of the cell. A spacer 12, e.g. of polymethylmethacrylate, separates the slides 4,5 to the required distance, e.g. 5 microns. The liquid crystal material 6 is introduced between the slides 4,5 by filling the space between the slides 4,5 and spacer 12 and sealing the spacer 12 in a vacuum in a known way.

A suitable liquid crystal composition for the material 6 is as follows:

Composition 1 comprising components 1, 2 and 3 as follows:

1. Racemic C₈H₁₇—⟨○⟩—⟨○⟩—COO—⟨○⟩—COOCH₂CH(CH₃)(CH₂)₃CH₃ 41.5 wt. %

2. L-(+)-C₉H₁₉O—⟨○⟩—⟨○⟩—COO—⟨○⟩—COOCH(CH₃)CO₂C₂H₅ 41.5 wt. %

3. D-(−)-C₈H₁₇O—⟨○⟩—COO—⟨○⟩—COO—CH₂CH(CH₃)C₂H₅ 17 wt. % which as a room temperature S*c phase and an S$_C$–S$_A$ transition temperature of 66° C. L and D represent the sense of the optical activity and (+) and (−) represent the sense of polarisation. The Ps of this mixture was 25$_n$ C cm$^{-2}$ at about 25° C.

A polarizer 1 is arranged with its polarization axis parallel to the rubbing direction on the films 10, 11 and an analyzer (crossed polarizer) 9 is arranged with its polarization axis perpendicular to that rubbing direction.

When a square wave voltage (from a conventional source not shown) varying between about +10 volts and −10 volts is applied across the cell by making contact with the layers 7 and 8 the cell is rapidly switched upon the change in sign of the voltage between a dark state and a light state as explained above.

In an alternative device (not shown) based on the cell construction shown in FIG. 2, the layers 7 and 8 may be selectively shaped in a known way, e.g. by photoetching or deposition through a mask, e.g. to provide one or more display symbols, e.g. letters, numerals, words or graphics and the like as conventionally seen on displays. The electrode portions formed thereby may be addressed in a variety of ways which include multiplexed operation.

An alternative composition for use as the material 6 in the above described device is one containing the following components in the proportions stated:

| Component formula: | Percentage by weight |
|---|---|
| n-C₉H₁₉—⟨○⟩—CO.O—⟨○⟩—OC₆H₁₃-n | 41.5 |
| n-C₉H₁₉—⟨○⟩—CO.O—⟨○⟩—OC₈H₁₇-n | 21 |
| n-C₉H₁₉—⟨○⟩—CO.O—⟨○⟩—OC₁₀H₂₁-n | 15.5 |
| n-C₈H₁₇O—⟨○⟩—CO.O—⟨○⟩—CO.O—R$_C$ (racemic isomer) | 4 |
| n-C₈H₁₇O—⟨○⟩—⟨○⟩—CO.O—R$_C$ (racemic isomer) | 4 |
| n-C₈H₁₇O—⟨○⟩—⟨○⟩—CO.O—⟨○⟩—R$_C$ (racemic isomer) | 4 |

-continued

| Component formula: | Percentage by weight |
|---|---|
| n-C₈H₁₇O—⟨○⟩—⟨○⟩—CO.OCH(CH₃)CO.OC₂H₅ (S - isomer) | 10 | where R$_C$ represents 2-methylbutyl.

We claim:

1. A lactic acid derivative having the formula:

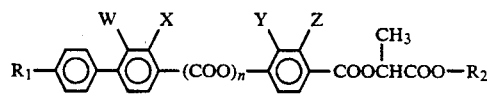

wherein R₁ is alkyl or alkoxy an R₂ is alkyl, the total number of carbon atoms in R₁ plus R₂ being 25 or less; W and X are independently selected from H and F; Y and Z are independently selected from H and Cl provided not more than one of Y and Z is Cl; n is 0 or 1 provided that if n is O then Y and Z are both H; and provided that if n is 1 then W and Y are both H.

2. Derivative according to claim 1, wherein R₁ is C₅–C₁₂ n-alkyl or n-alkoxy; R₂ is C₁–C₅ n-alkyl and only one of W and X may be F.

3. Derivative according to claim 1 or 2 having the formula:

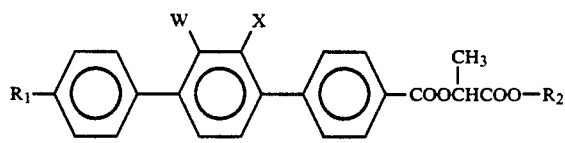

wherein either both of W and X are H, or one is H and the other is F.

4. Derivative according to claim 3 wherein R₁ is selected from the group consisting of n-pentyl, n-nonyl and n-octyloxy, and R₂ is ethyl.

5. Derivative according to claim 1 or 2 having a formula:

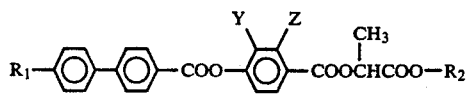

6. Derivative according to claim 5 wherein R₁ is selected from the group consisting of n-octyl, n-nonyl, n-decyl, n-octyloxy and n-nonyloxy, and R₂ is ethyl.

7. Liquid crystalline composition consisting of at least two compounds wherein at least one of said compounds is a compound as claimed in claim 1.

8. Liquid crystalline composition according to claim 7 wherein the said compound of claim 1 is in an optically active form and induces a ferroelectric smectic phase in a smectic host.

* * * * *